United States Patent [19]
Shibuya

[11] Patent Number: 5,497,429
[45] Date of Patent: Mar. 5, 1996

[54] APPARATUS FOR AUTOMATIC FINGERPRINT CLASSIFICATION

[75] Inventor: Tatsuo Shibuya, Tokyo, Japan

[73] Assignee: NEC Corporation, Tokyo, Japan

[21] Appl. No.: 313,562

[22] Filed: Sep. 29, 1994

[30] Foreign Application Priority Data

Oct. 1, 1993 [JP] Japan .................................... 5-246801

[51] Int. Cl.⁶ ..................................................... G06K 9/00
[52] U.S. Cl. ............................................. 382/125; 382/316
[58] Field of Search .................. 382/2, 3, 4, 5, 382/30, 34, 22, 60, 124, 125, 127, 126, 199, 313, 316, 209, 218

[56] References Cited

U.S. PATENT DOCUMENTS

| | | | |
|---|---|---|---|
| 4,817,183 | 3/1989 | Sparrow | 382/4 |
| 5,040,224 | 8/1991 | Hara | 382/4 |
| 5,177,792 | 1/1993 | Morita | 382/4 |
| 5,337,369 | 8/1994 | Shibuya | 382/5 |

FOREIGN PATENT DOCUMENTS

| | | |
|---|---|---|
| 55-138174 | 10/1980 | Japan . |
| 63-153687 | 6/1988 | Japan . |
| 1-271883 | 10/1989 | Japan . |
| 2050026 | 12/1980 | United Kingdom . |

OTHER PUBLICATIONS

Singh et al., "Feature Recognition and Classification in Fingerprint Patterns," *Proc. of Int. Conf. on Crime Countermeas.*, Science and Engineering, Jul. 25–29, 1977, pp. 241–248.

Luk et al., "A Two–Level Classifier for Fingerprint Recognition," *IEEE International Symposium on Circuits and Systems*, vol. 5, 1991, Singapore, pp. 2625–2628.

*Primary Examiner*—Joseph Mancuso
*Assistant Examiner*—Peter Park
*Attorney, Agent, or Firm*—Foley & Lardner

[57] ABSTRACT

In fingerprint pattern classification, radial scanning vectors are used. A space between two adjacent ridge lines including a core point is traced by radial scanning. Radial distribution of number of cross points from the core point is a clue to a fingerprint classification.

2 Claims, 12 Drawing Sheets

63: RIDGE LINE SHAPE OF LOCUS 61
64: RIDGE LINE SHAPE OF LOCUS 62

| | WHORL | LEFT LOOP | RIGHT LOOP | ARCH |
|---|---|---|---|---|
| PATTERN |  |  |  |  |
| RIDGE LINE SHAPE |  |  |  |  |

90: GROUP OF SCANNING LINES
900~916: SCANNING LINES

| | (a) | (b) | (c) | (d) | (e) |
|---|---|---|---|---|---|
| CLASSIFICATION | UNDESIDED | WHORL | LEFT LOOP or WHORL | RIGHT LOOP or WHORL | LEFT LOOP or RIGHT LOOP or ARCH |
| PATTERN | |  |  |  |  |
| DISTRIBUTION | |  |  |  | |

FIG. 12

| CLASSIFIED AT STEP 31 | CLASSIFIED AT STEP 83 | CLASSIFIED AT STEP 85 |
|---|---|---|
| WHORL | WHORL | UNDESIDED |
| WHORL | LEFT LOOP OR WHORL | LEFT LOOP |
| WHORL | RIGHT LOOP OR WHORL | RIGHT LOOP |
| RIGHT LOOP | WHORL | WHORL |
| RIGHT LOOP | WHORL | WHORL OR LEFT LOOP |
| RIGHT LOOP | RIGHT LOOP OR WHORL | WHORL OR RIGHT LOOP |
| LEFT LOOP | UNDESIDED | RIGHT LOOP |
| LEFT LOOP | LEFT LOOP | UNDESIDED |
| LEFT LOOP | RIGHT LOOP | LEFT LOOP |
| ARCH | UNDESIDED | LEFT LOOP |
| ARCH | UNDESIDED | RIGHT LOOP OR ARCH |
| ARCH | UNDESIDED | LEFT LOOP OR ARCH |
| ARCH | | ARCH |

5,497,429

APPARATUS FOR AUTOMATIC FINGERPRINT CLASSIFICATION

BACKGROUND OF THE INVENTION

This invention relates to an apparatus for automatic fingerprint classification.

There are two types of processing fingerprint images for automatic fingerprint classification. In a first type of processing, a fingerprint image is subdivided in a plural number of subregions, and for each subregion, a ridge line direction is quantized, a core point of the fingerprint image is determined from quantized ridge line directions of subregions, and the fingerprint is classified in accordance with the shape and the direction trend of ridge line directions in an area near to the core point. This type of processing is disclosed, for example, in a U.S. Pat. No. 5,337,369.

In a second type of processing, ridge lines of a fingerprint are processed to produce a thin line in the center of each ridge line. This type of processing is disclosed, for example, in a Japanese patent application entitled "A method and an apparatus for fingerprint pattern detection" and laid open as a Provisional Publication No. 153687/'88, wherein thinned ridge lines are approximated by fragmental straight line segments. The fingerprint is classified in accordance with direction distribution of these straight line segments.

In these two types of processing, there are advantages and disadvantages. When a fingerprint is smudged, ridge line direction of a smudged subregion can not be determined, or it is mistakenly determined. This is a disadvantage of the first type of processing. And, in the method disclosed by tile Provisional Publication No. 153687/'88, the core point is not used for classification. This is a disadvantage of the second type processing, as ridge line directions in a neighborhood of the core point are most important for classification.

SUMMARY OF THE INVENTION

Therefore, an object of the present invention is to provide an apparatus for automatic fingerprint classification wherein advantages of the two types of processing are combined.

In this invention, thinned ridge lines are used for determining the shape of the ridge lines, but the area of scanning is limited in accordance with the position of the core point.

For the following descriptions, position coordinates of a fingerprint image will be determined. The core point of a fingerprint is used as an origin of the coordinates, a line parallel to a joint of the finger is determined as the X axis of an x-y rectangular coordinates. The tip of the finger is taken as +y direction of the coordinates.

In a first embodiment of this invention, a space including the core point between two ridge lines is traced by a joint of straight line segments, and from the shape of the result of tracing, the fingerprint is classified.

In a second embodiment of this invention, a predetermined number of vectors of a predetermined length starting from the core point are used for scanning ridge lines of a fingerprint image. Number of ridge lines crossed by a vector is represented as an ordinate of a graph with the direction of the vector as an abscissa. From the shape of the graph, the fingerprint is classified.

When an ambiguity remains for classifying a fingerprint by the second embodiment of this invention, a third embodiment of this invention can be applied, and the starting point of a vector having the smallest number of cross points, is displaced on the Y axis, and the ridge lines are scanned by the new vector.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

FIG. 12 shows integrated means for fingerprint classification of this invention.

DETAILED DESCRIPTION OF THE PREFERRED EMBODIMENTS

Figure 1:
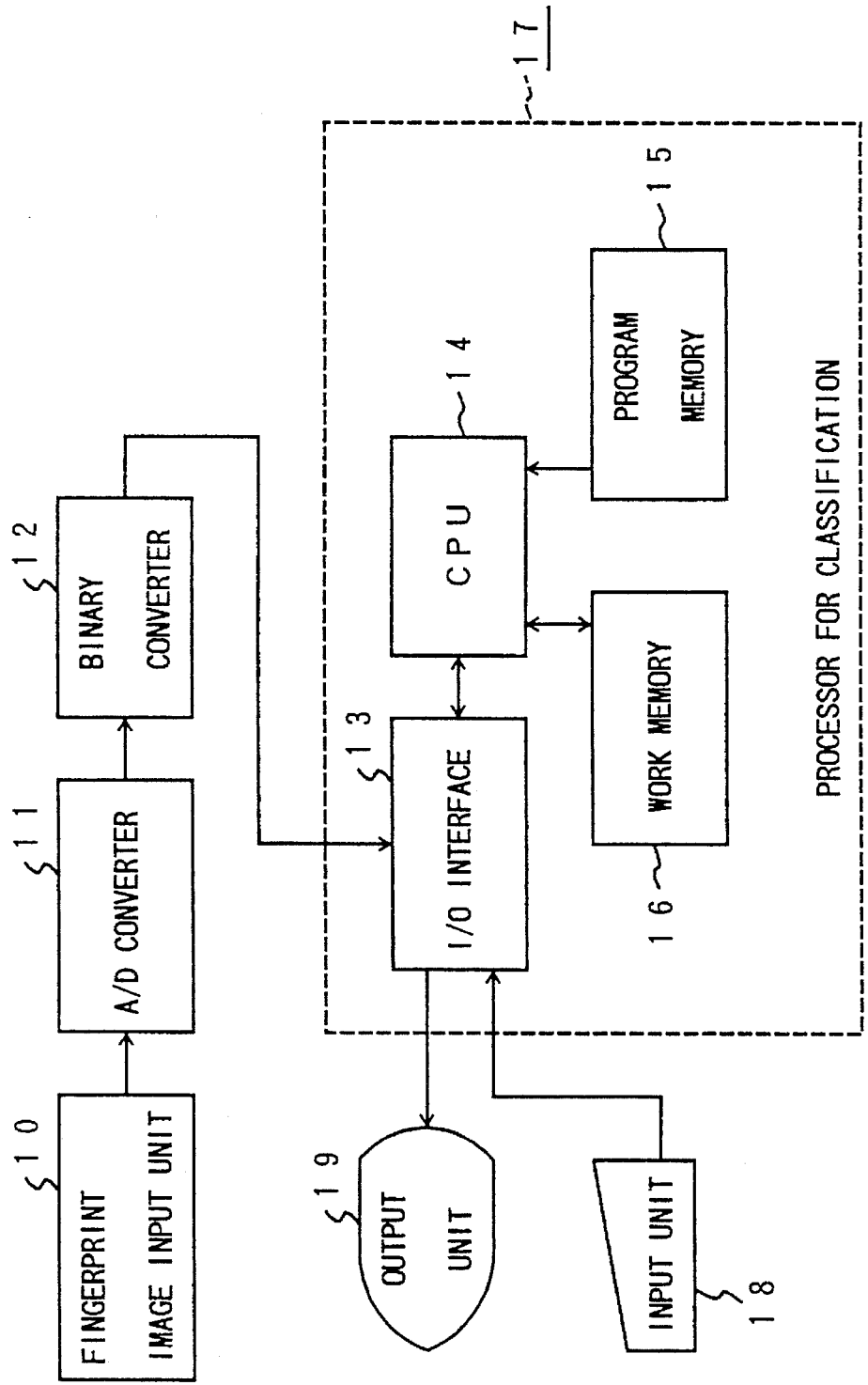
FIG. 1 shows a block diagram illustrating an embodiment of this invention.

Referring to FIG. 1, a fingerprint image input unit 10 comprises a photo-electric transducer for producing an electrical signal of a fingerprint picture taken, for example, from a surface of a finger placed on a transparent plate or from a fingerprint picture printed on a sheet. The electrical signal output from the fingerprint image input unit 10 is converted to digital signals by an A/D converter 11, and then converted to binary(black or white) signals by a binary converter 12. A set of binary signals from the binary converter 12 is stored in the fingerprint image memory 170(FIG. 3) in a two-dimensional area, and each binary signal representing a point of a fingerprint picture is stored at an address of the image memory 170 corresponding to the coordinate position of the point in the fingerprint picture.

A processor for classification 17 classifies the fingerprint pattern stored in the image memory 170. An input unit 18 is used for entering necessary information to the processor 17, and an output unit 19 is used for displaying necessary information from the processor 17.

An I/O interface unit 13 serves as an interface between the processor 17 and the I/O units 12, 18 and 19. A CPU 14 has a program memory 15 and a work memory 16 wherein the fingerprint image memory 170(FIG. 3) is included. Data from the image memory 170 is processed by a program controlled CPU 14 in the processor for classification 17.

Figure 3:
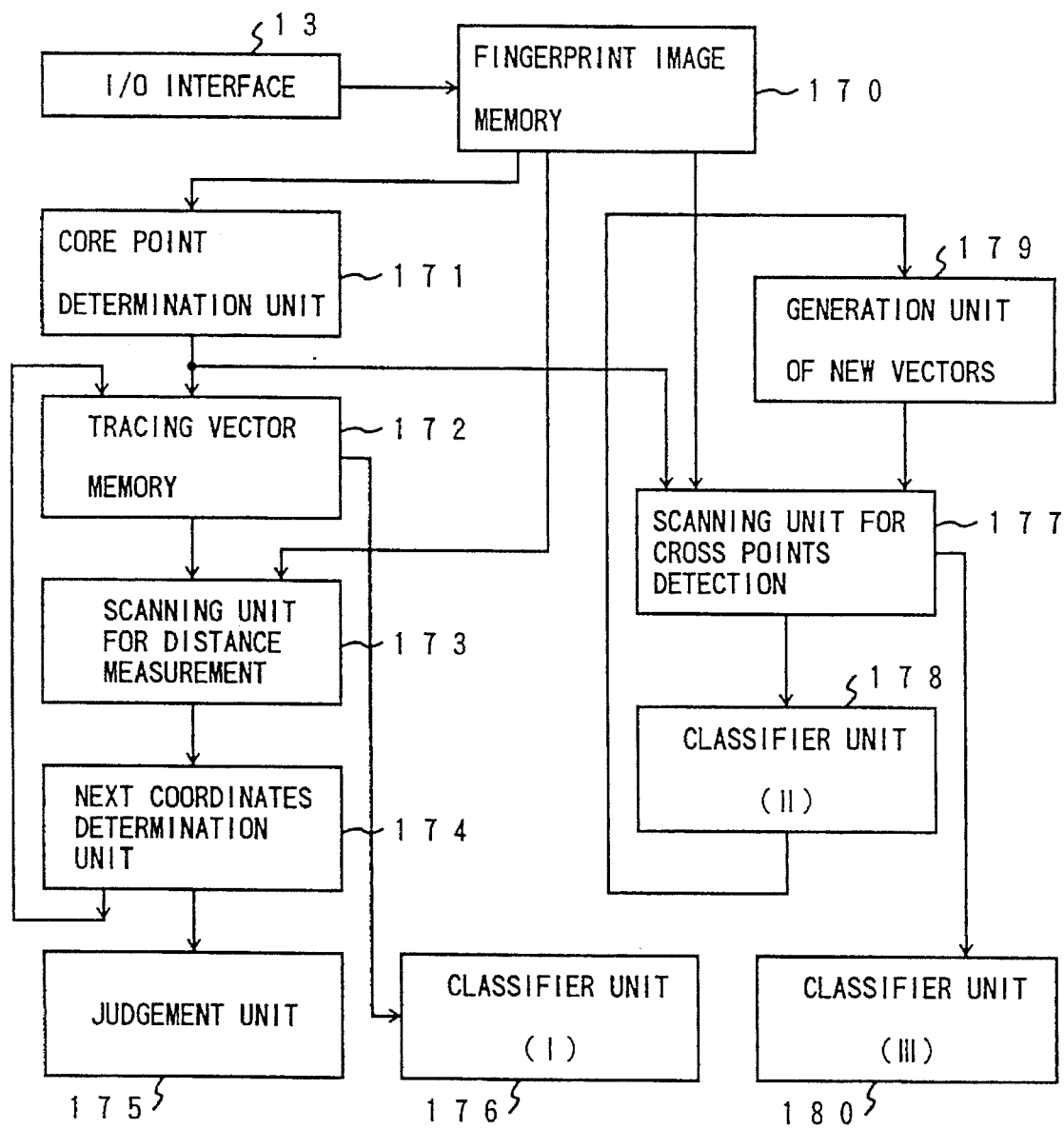
FIG. 3 shows a block diagram representing functions performed by program control in a processor for classification of FIG. 1.

FIG. 3 shows a block diagram representing functions of the processor for classification 17 of FIG. 1.

Figure 2:
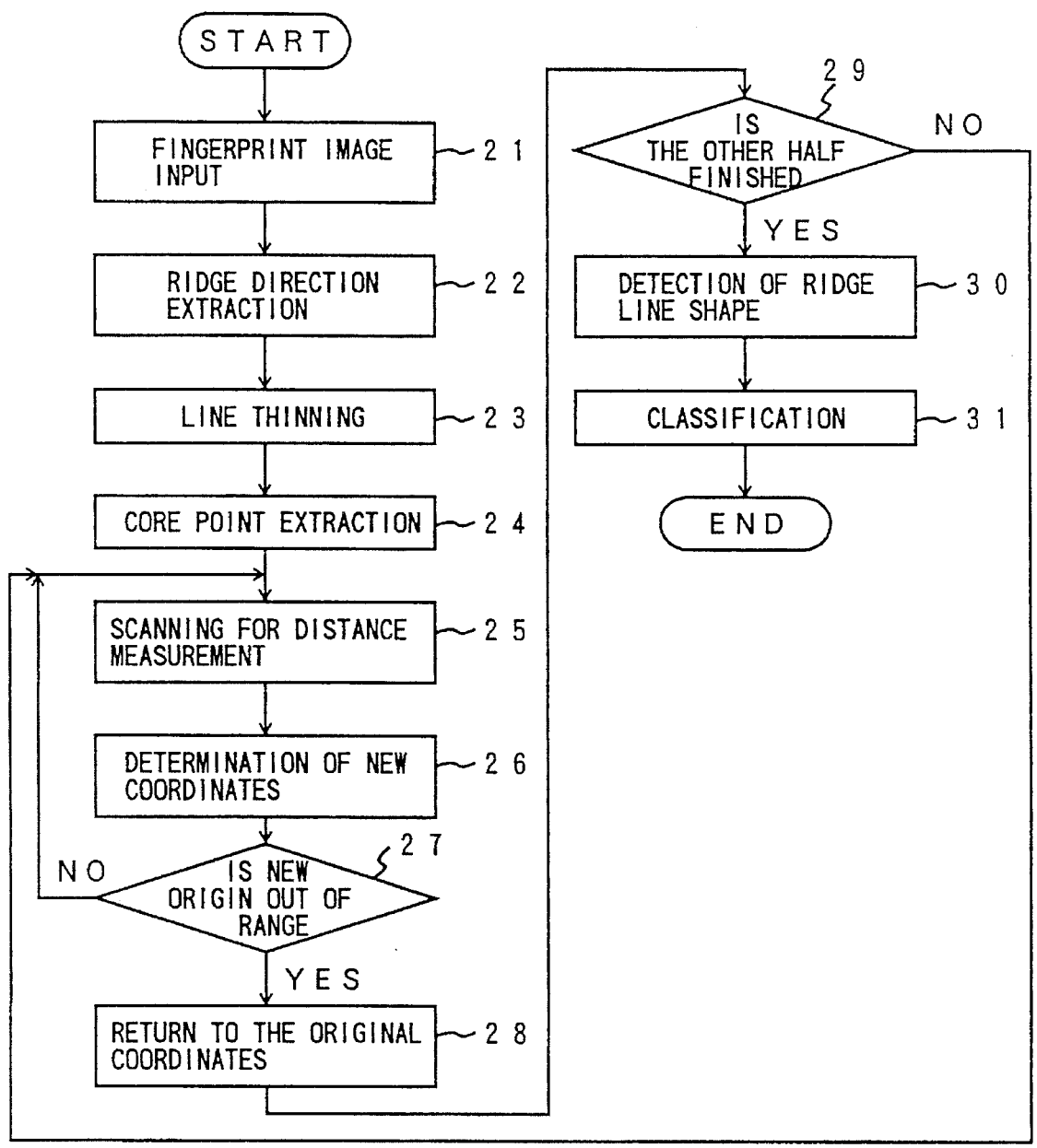
FIG. 2 shows a flow chart of a first embodiment of this invention.

In the flow chart of FIG. 2, program steps from 21 to 24 are well known, for example as disclosed in a Japanese Patent Application entitled "An apparatus for extracting pattern features" and laid open under a Provisional Publication NO.138174/'80, and in a Japanese Patent Application entitled "An extraction of a core point of a fingerprint" and laid open under a Provisional Publication NO. 271883/'89. These steps will not be explained here.

At a step 22, a fingerprint image data are binarized before ridge direction extraction. Line thinning in a step 23 is a recommended but is not an indispensable step of this invention. In descriptions of later paragraphs, it will become apparent that data collection in this invention is far easier for thinned ridge lines, but is feasible when the fingerprint image is represented in binary signals.

Steps 25, 26, and 27 are described in connection with FIG. 3, FIGS. 4a and 4b, FIGS. 5a and 5b, FIGS. 6a and 6b. At the step 24, the core point determination unit 171 determines the positional coordinates of the core point in the fingerprint image memory 170. As described earlier, a core point of a fingerprint image can be determined from quantized ridge line directions. For the core point determination unit 171, any conventional core point determination unit can be used. For example, a unit disclosed in Japanese Patent Application entitled "An Extraction of a Core Point of a Fingerprint" and laid open under a Provisional Publication No. 271883/'89 can be used in this invention. The positional coordinates of the core point are made as an origin of the original coordinates. This origin of the original coordinates is stored in a tracing vector memory 172, as a starting point of tracing.

Figure 4A:
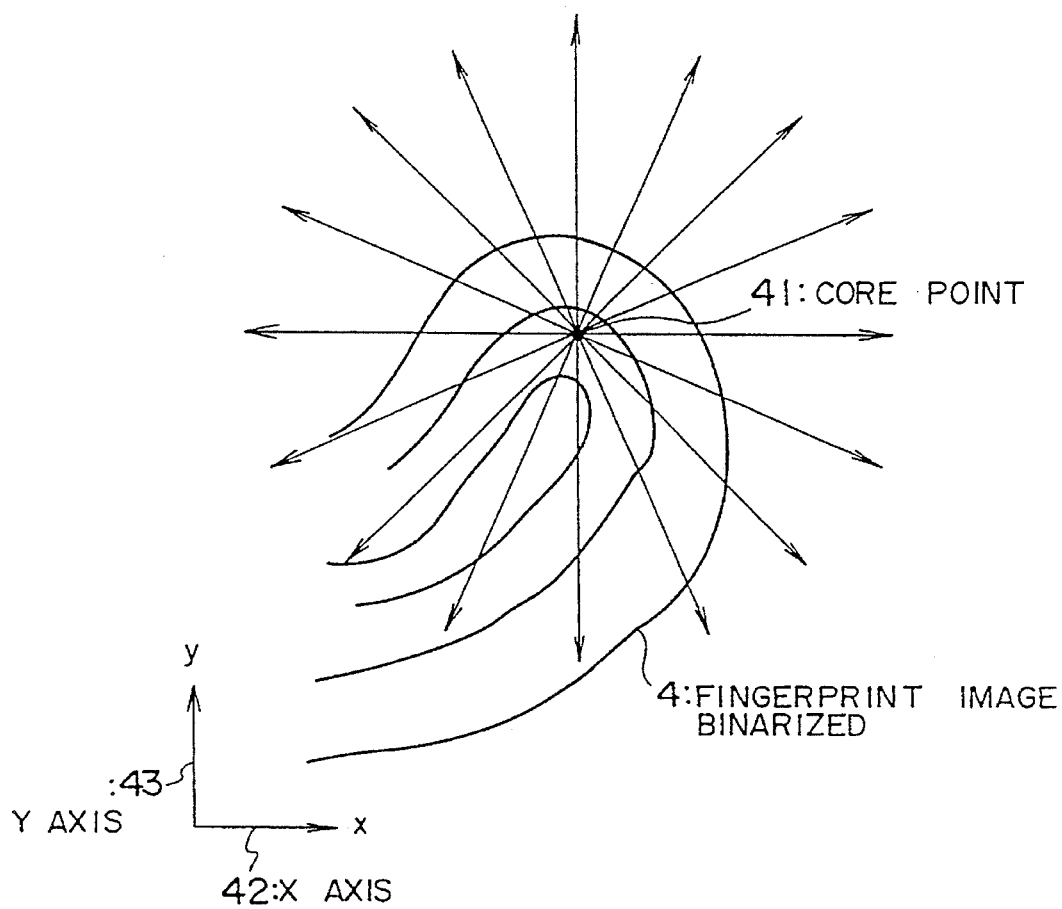
FIG. 4(a) shows scanning of a fingerprint image by scanning vectors in the first embodiment of this invention.
Figure 4B:
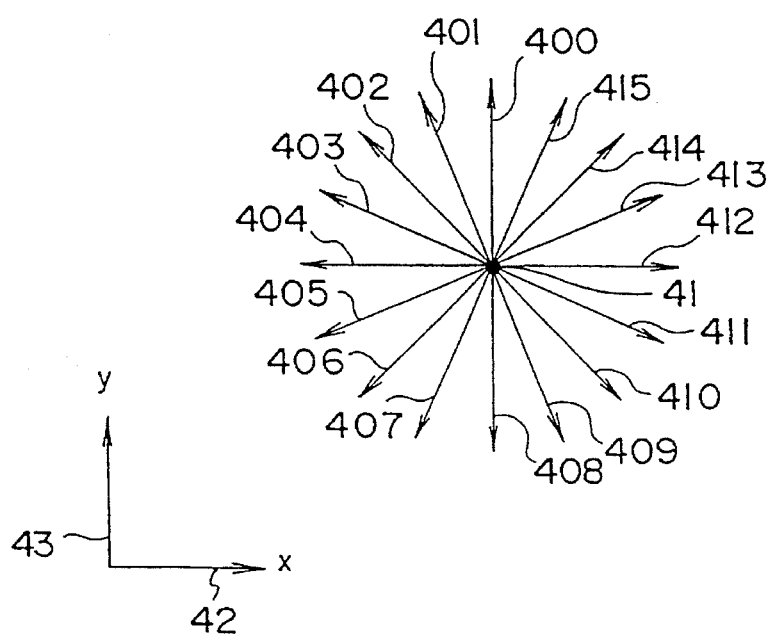
FIG. 4(b) show scanning vectors used in the first embodiment of this invention.

At a step 25, a scanning unit 173 scans the fingerprint image memory 170 for distance measurement. Sixteen vectors of a same magnitude V and spaced in a uniform angular spacing of $2\pi/16$ in the $2\pi$ space, and each originating at the coordinates origin(which is a core point 41) are used for scanning the fingerprint image memory 170 where the fingerprint image is shown as binarized data 4. These vectors are numbered from 400 to 415 as shown in FIG. 4(b), the vector 400 being coincident with the Y axis and the vector 412 being coincident with the X axis.

Figure 5A:
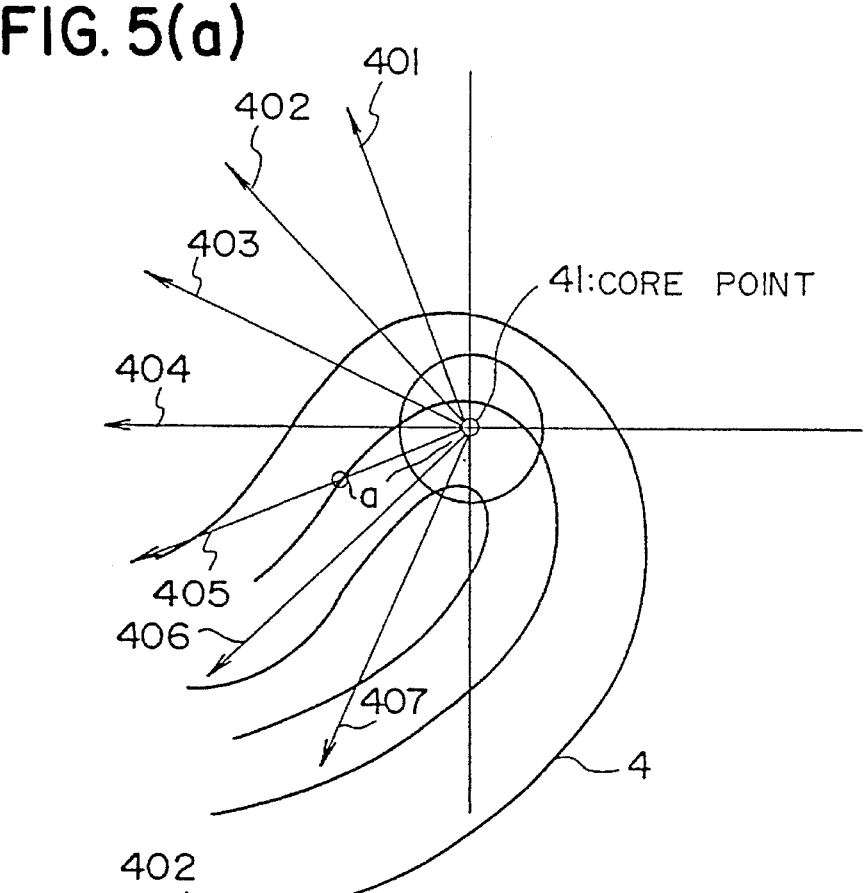
FIG. 5(a) shows a step of ridge line tracing in the first embodiment of this invention.

For scanning in a region where x<0, the fingerprint image 4 is scanned by vectors 401–407, all of which have components in −x direction. Referring to FIG.5(a), in this scanning, a first cross point of a vector and a ridge line is detected, the distance of the cross point from the origin is calculated, and cross points having a distance less than a predetermined threshold T1 (represented by a circle of radius T1 with the center at the origin) are ignored. Of all the cross points outside the circle, a cross point on a vector nearest to the −X axis(the vector 404, including the vector 404 itself) (represented by a small circle on the vector 405 in FIG. 5(a)) is selected.

Then, the step goes to a step 26 and a next coordinates determination unit 174 is put in action. When the cross point have distance "a" from the origin, the next temporary coordinates are determined in a following process. The vector 405 is −X axis of the next temporary coordinates, and a point on the vector displaced by a/2 from the previous origin(core point 41) is the new origin of the next temporary coordinates. The direction of the vector 405 and the displacement a/2 are recorded in the tracing vector memory 172.

Figure 5B:
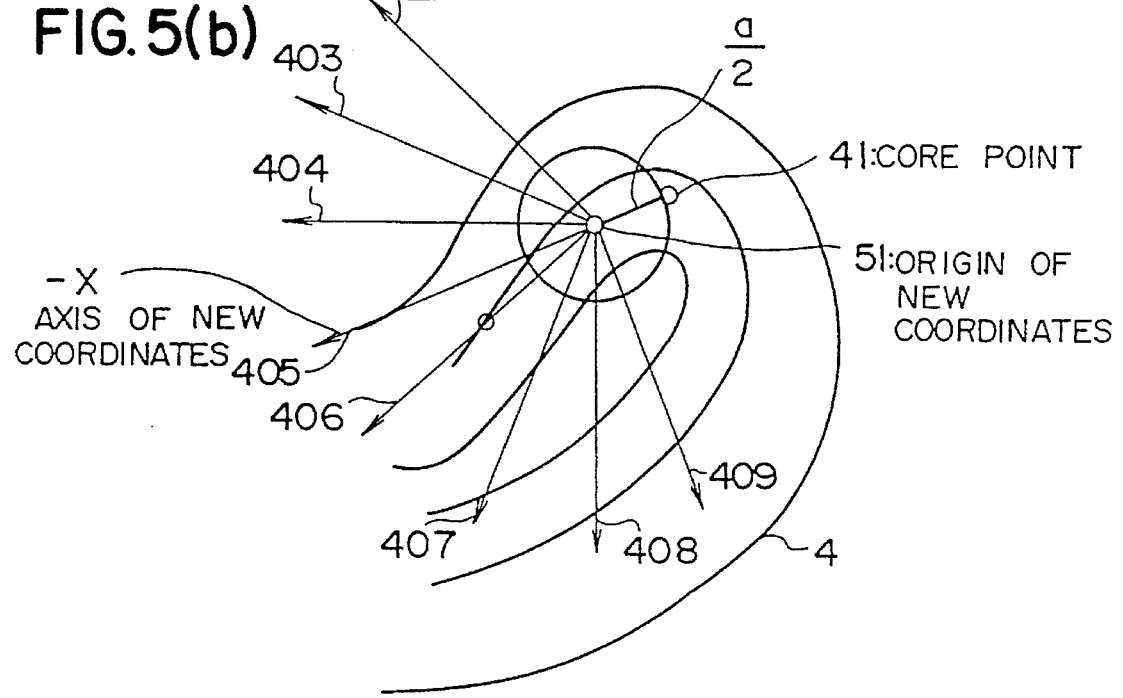
FIG. 5(b) show an example of ridge line tracing in the first embodiment of this invention.

A judgement unit 175 performs the judgement at a step 27. When the origin 51 of the new temporary coordinates is in the predetermined range(as determined by a circle connecting the end points of the vectors), the step returns to the step 25, and the image memory 170 is scanned by vectors 402–409, all of which have a component along the vector 405. As shown in FIG. 5(b), the next −X axis of a temporary coordinates is determined as the vector 406. The vector 406 and the displacement of the origin are stored in the tracing vector memory 172.

Figure 6A:
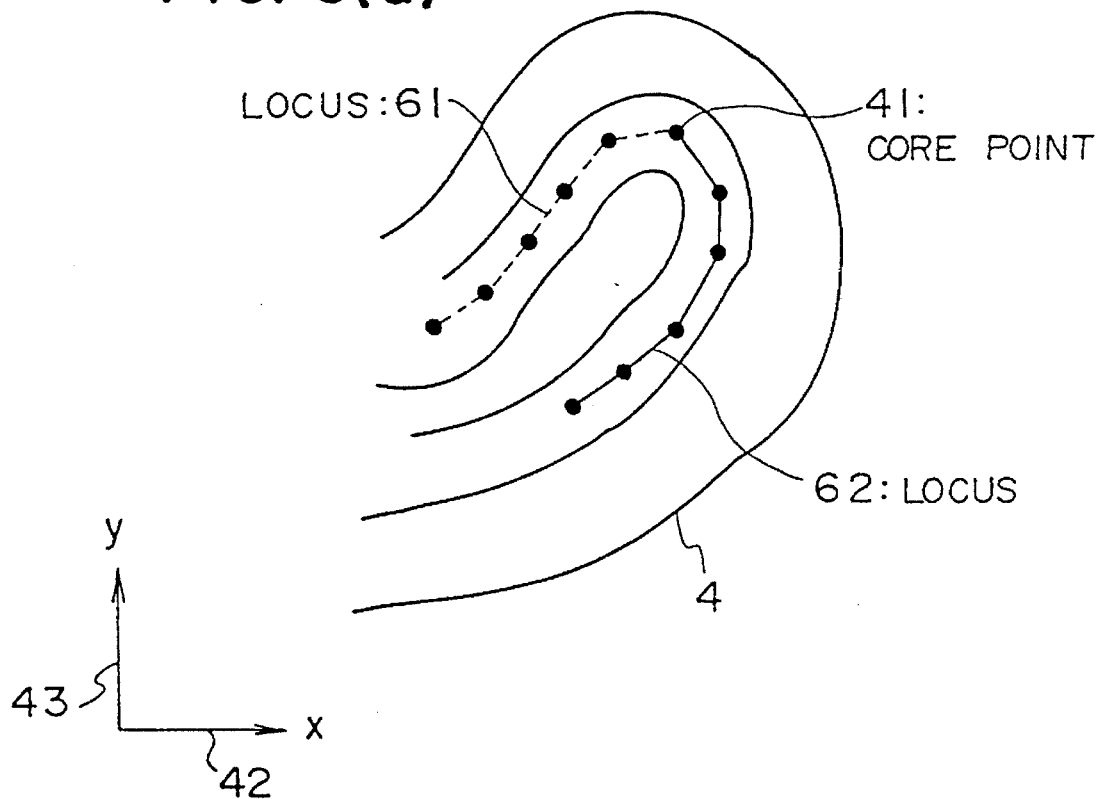
FIG. 6(a) illustrates a result of tracing in the first embodiment of this invention.
Figure 6B:
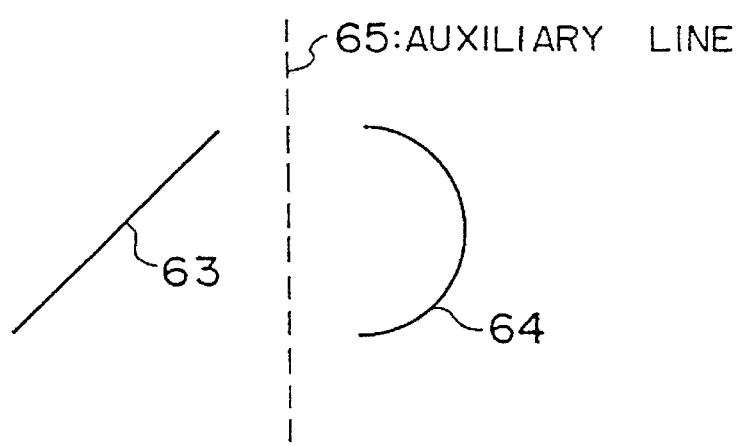
FIG. 6(b) illustrates ridge line shape obtained from the result of tracing shown in FIG. 6(a).

When the answer at the step 27 is yes, the step goes to a step 28, where coordinates are returned to the original coordinates, and the program step is returned to the step 25 through a step 29, for tracing in an area where x>0. The fingerprint image 4 is scanned by vectors 415–409, all of which have components in +x direction. The tracing in the +x area is performed in a same way as in the −x area, repeating the steps 25, 26, 27, 25. When the tracing in the +x region is finished, the result of tracing stored in the tracing vector memory 172 will be as shown by FIGS. 6a and 6b. Black dots in FIG. 6(a) represent origins of temporary coordinates determined by the step 25 and the core point 41. Dotted line segments represent temporary −X axes, and solid line segments represent temporary +X axes.

At a step 30, ridge line shape is detected from the result of tracing as shown in FIG. 6(a) by a classifier unit (I) 176. The locus 61 and 62 represent ridge line shape in −x and +x areas respectively. The locus 61 is represented by a ridge line shape 63 (FIG. 6(b)) of a straight line in the direction of the vector 406, since all the straight line segments in the locus 61 have components in −x direction and components in −y direction.

The locus 62 is represented by a ridge line shape 64(FIG. 6(b)) of a semicircle, since there are at least one straight line segment having a component in +x direction and at least one straight line segment having a component in −x direction. An auxiliary line 65 represents a line where x=0.

Figure 7:
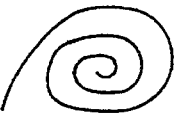
FIG. 7 illustrates means for classifying fingerprints in the first embodiment of this invention.
Figure 7:
Figure 7:
Figure 7:
Figure 7:
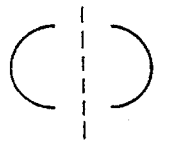
Figure 7:
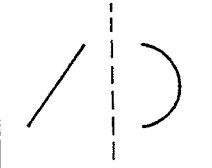
Figure 7:
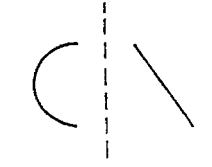
Figure 7:
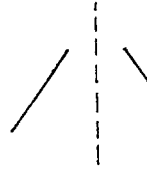

At a step 31, the fingerprint is classified in accordance with the ridge line shape detected at the step 30. Referring to FIG. 7, there are four different ridge line shapes, and each ridge line shape represents a corresponding pattern shown in FIG. 7.

The result of the classification obtained at the step 31 is displayed at the output unit 19 through the I/O interface unit 13.

Figure 8:
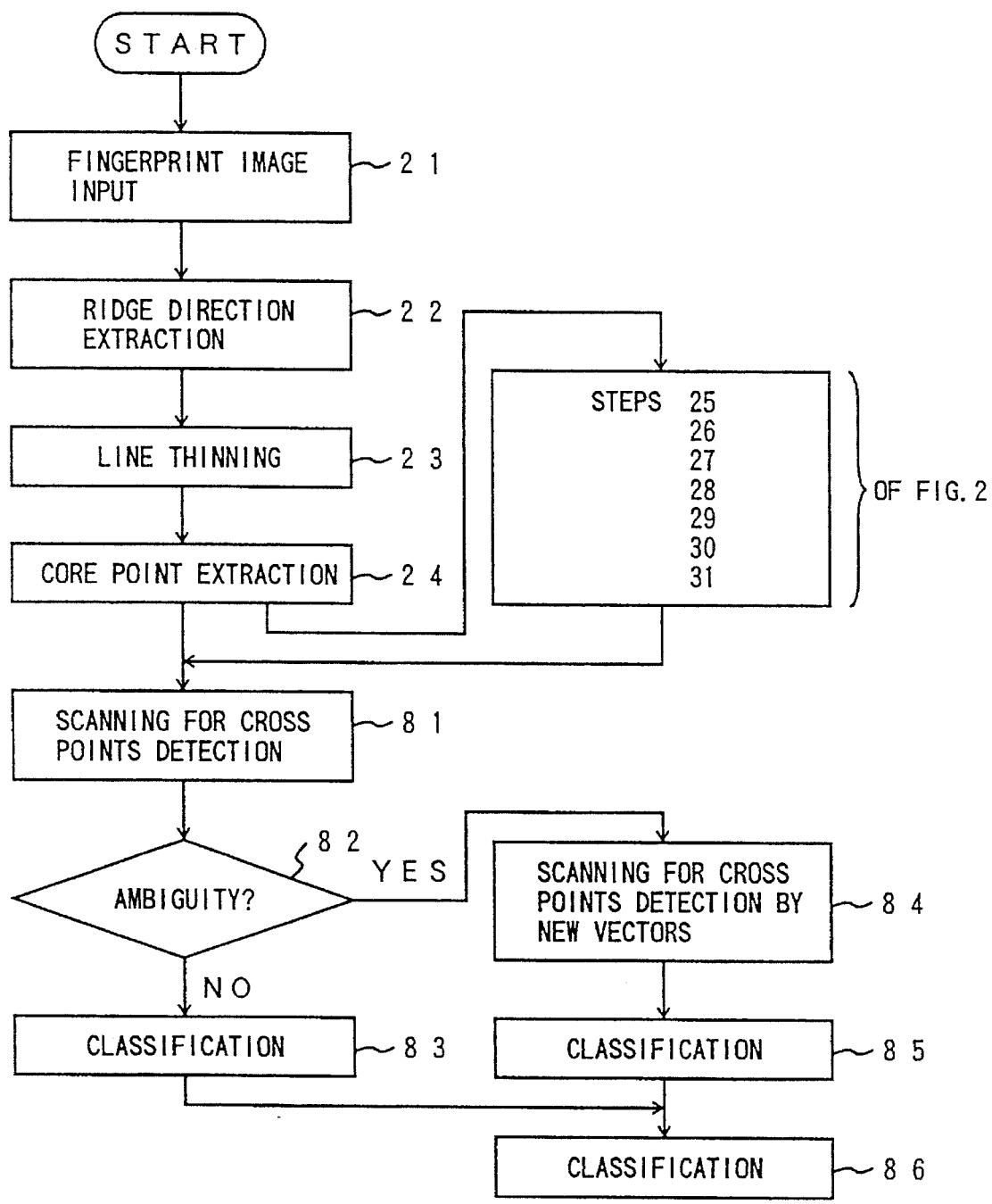
FIG. 8 shows a flow chart of a second and a third embodiment of this invention.
Figure 9A:
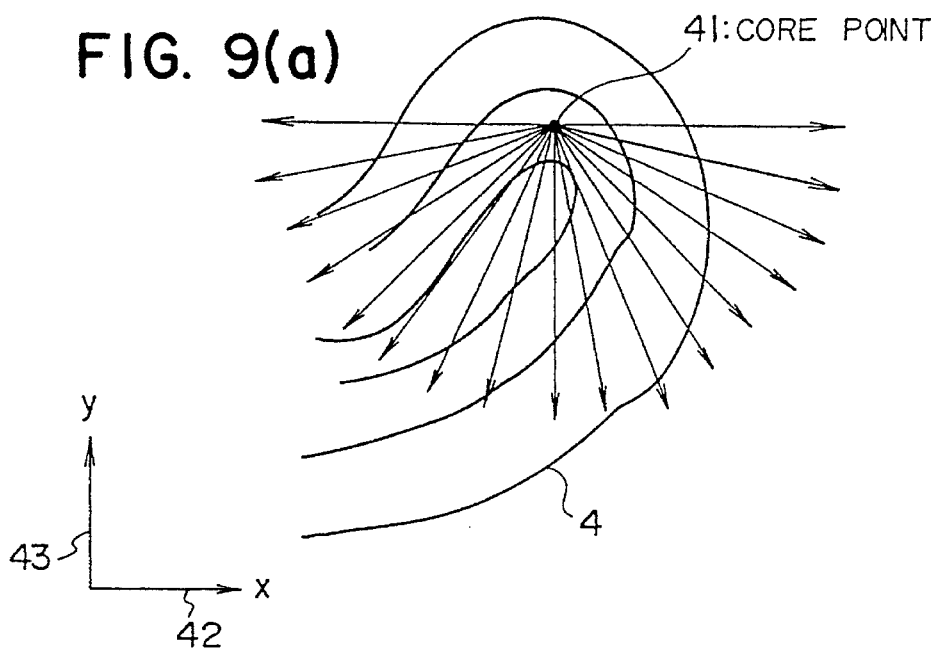
FIG. 9(a) shows scanning fingerprint image by scanning vectors in the second embodiment of this invention.
Figure 9B:
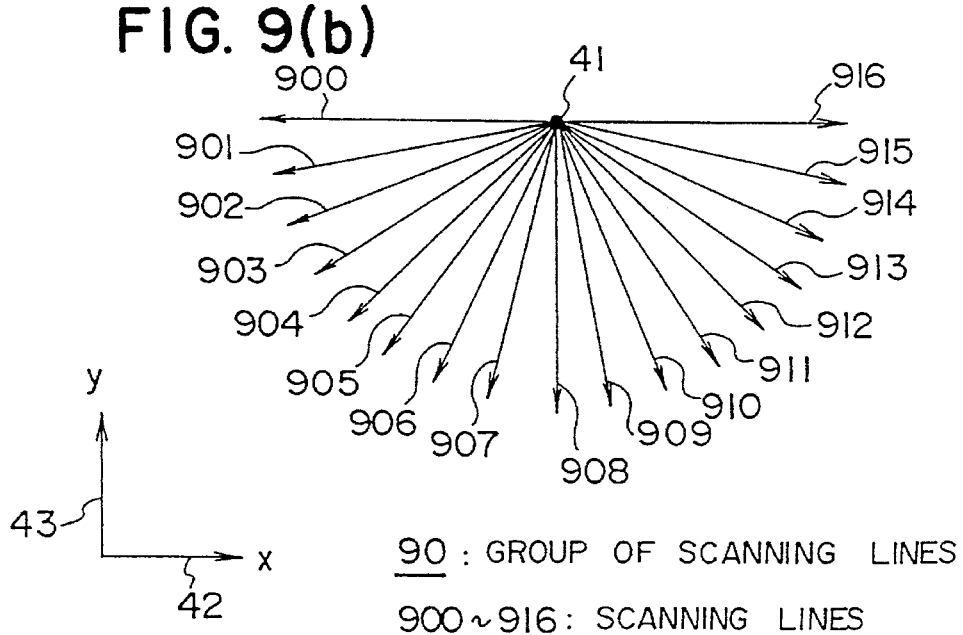
FIG. 9(b) shows scanning vectors used in the second embodiment of this invention.
Figure 9C:
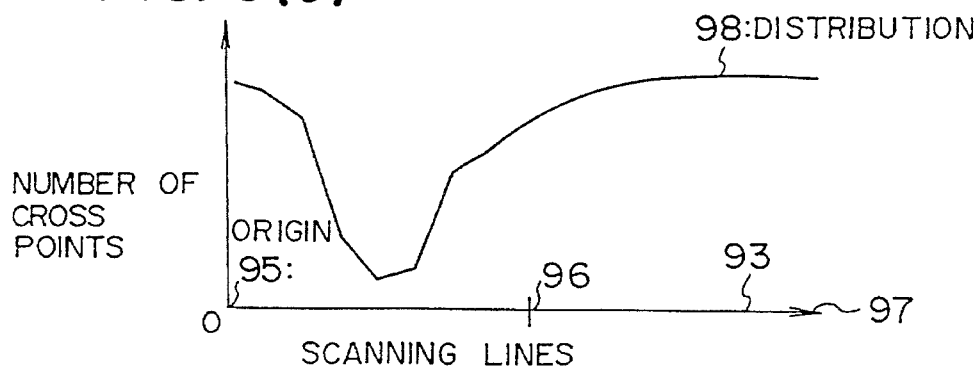
FIG. 9(c) shows a distribution of numbers of cross points in the second embodiment of this invention.

Now referring to the flow chart of FIG. 8, the second and the third embodiment of this invention is described. After the step 24, the fingerprint image 4 is scanned by a scanning unit 177 for cross points determination at a step 81. In an embodiment shown in FIGS. 9a, 9b and 9c there are seventeen scanning vectors of a same magnitude as shown by 900–916 in FIG. 9(b). These seventeen vectors have uniform angular spacing of $\pi/16$ in a $\pi$ space where y<0. The direction of the vector 900 coincides with −X axis, that of the vector 908 coincides with −Y axis, and that of the vector 916 coincides with +X axis.

In this scanning, number of cross points n between the scanning vector and the ridge lines are detected. For example, n(908) denotes number of cross points between the vector 908 and the ridge lines. And in the step 81, the detected number n is represented as an ordinate 94 of a graph shown by FIG. 9(c) with the direction of the scanning vector as an abscissa 93. The vector 900 is placed at the origin 95 of the abscissa, the vector 908 is placed at the center 96 of the abscissa, and the vector 916 is placed at the far end 97 of the abscissa. The distribution 98 of n thus determined is used as a key for fingerprint classification.

At a step 82, the distribution 98 obtained at the step 81 is examined as to whether a further scanning is necessary or not. When the distribution 98 has two minimum points as shown in column(e) of FIG. 10,, it is decided that a further scanning is necessary, and the step goes to a step 84. Otherwise, the step goes to a step 83, where the fingerprint is classified by a classifier (II) 178 in accordance with FIG. 10.

Figure 10:
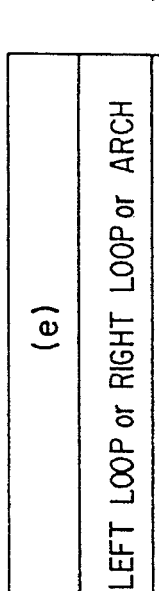
FIG. 10 illustrates means for classifying fingerprints in the second embodiment of this invention.
Figure 10:
Figure 10:
Figure 10:
Figure 10:
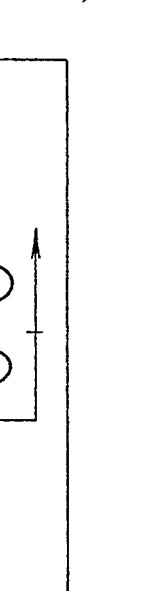
Figure 10:
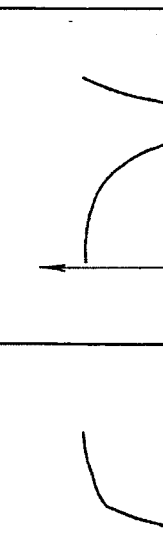
Figure 10:
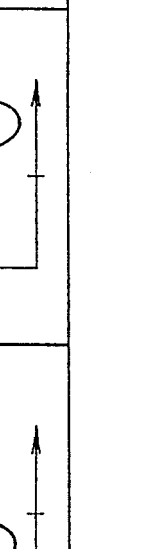

When a minimum point of the distribution 98 is near the center 96 of the abscissa 93, the fingerprint is classified as a whorl, as in column(b) of FIG. 10. When the minimum point is in the left of the center 96 of the abscissa 93, the fingerprint is classified as a whorl or a left loop, as in column(c) of FIG. 10. And when the minimum point is in the right of the center 96 of the abscissa 93, the fingerprint is classified as a whorl or a right loop, as in column(d) of FIG. 10.

Figure 11A:
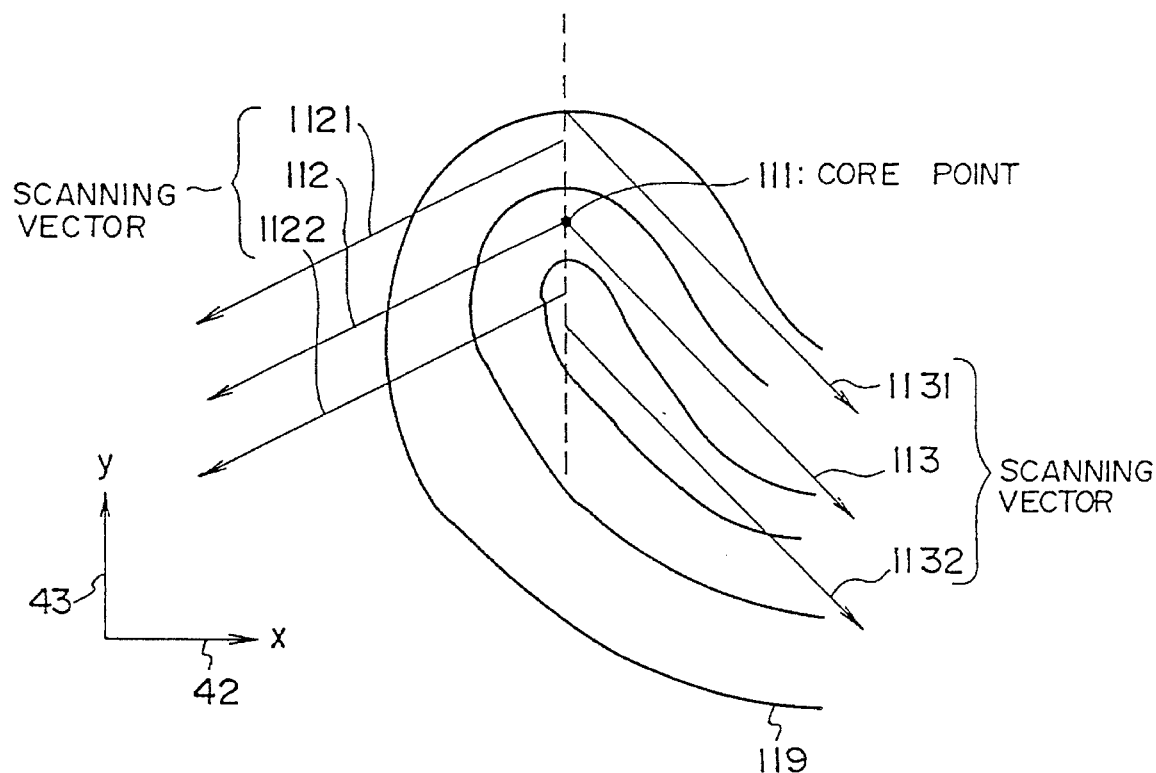
FIG. 11(a) shows scanning of a fingerprint image by scanning vectors in the third embodiment of this invention.

At the step 84, the third embodiment of this invention is performed. As seen from the distribution shown in the column(e) of FIG. 10, there are two vectors which have minimum number of cross points, the one vector in −x and −y area, and the other vector in +x and −y area. These two vectors are shown as a vector 112 (called a first vector) and a vector 113 (called a second vector) in FIG. 11(a). Other four vectors, 1121 (called a third vector), 1122 (called a fourth vector), 1131 (called a the fifth vector), 1132 (called a sixth vector) are determined as shown in the drawing.

Figure 11B:
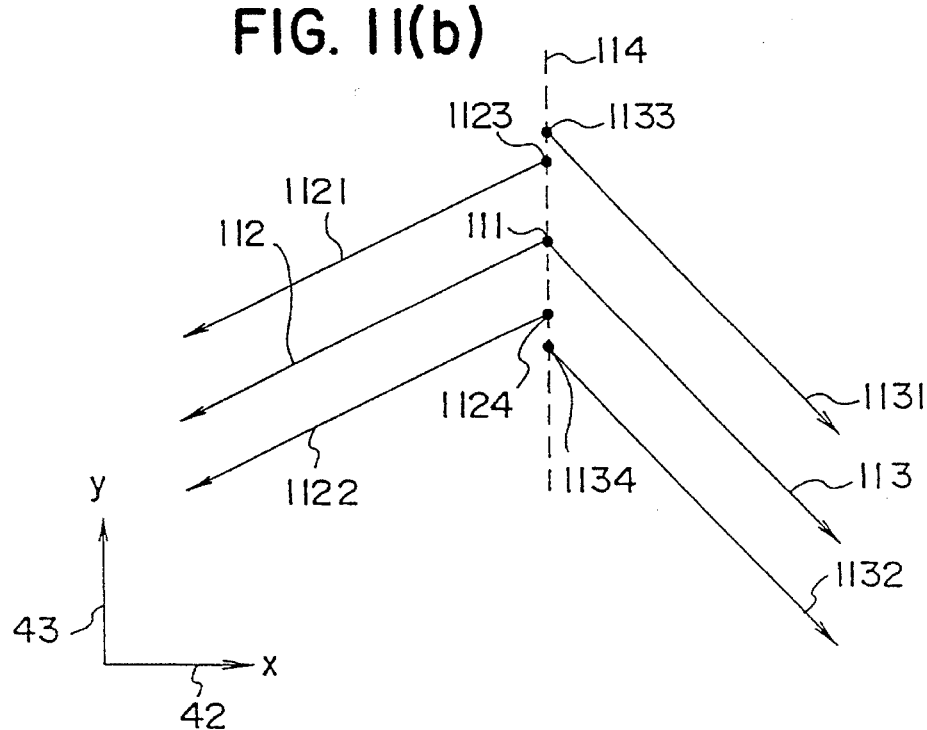
FIG. 11(b) shows scanning vectors used in the third embodiment of this invention.

The magnitude and the direction of the vectors 1121, 1122 are equal to those of the vector 112, and the magnitude and the direction of the vectors 1131, 1132 are equal to those of the vector 113. FIG. 11(b) shows these parallel scanning vectors. All the spaces between two adjacent parallel vectors are made to be equal to a predetermined magnitude "b". Start points of all these vectors are determined to be on x=0 line denoted by a numeral 114. Points 1123, 1124, 1133, and 1134 are these start points, The point 111 in FIG. 11(b) is the core point. The scanning unit 177 performs the scanning on these vectors.

Numbers of cross points obtained are denoted respectively by n(1121), n(1122), n(1131), n(1132). For a predetermined threshold value T2, when n(1122)−n(1121)>T2 and n(1132)−n(1131)≦T2     (1), the fingerprint image is classified as a right loop in a classification step 85, and when n(1122)−n(1121)≦T2 and n(1132)−n(1131)>T2     (2), the fingerprint image is classified as a left loop in the classification step 85.

When either inequality (1) or (2) is not satisfied, the fingerprint image is classified as "not determined". A classifier unit (III) 180 performs the comparison in inequalities (1) and (2) and the classification.

For a numerical example, when n(1122)=10, n(1121)=4, n(1132)=7, n(1131)=5, T2=4, the fingerprint image is classified as a right loop.

The second and the third embodiment of this invention are often performed after the first embodiment of this invention in order to confirm the result of classification at the step 31. In such a case, steps 25–31 of FIG. 2 are inserted between the step 24 and the step 81. At a step 86, a final classification is performed as shown by FIG. 12. For example, when a fingerprint image is classified as a whorl at the step 31, an ambiguity is detected at the step 82, and is classified as a left loop at the step 85, the fingerprint image is classified as "a whorl or a left loop" at the step 86. When the fingerprint image is to be classified to any one of the four patterns shown in FIG. 7, the fingerprint which is classified as a whorl at the step 31 is classified as a whorl disregarding the classification at the step 85.

In all the embodiments of this invention, the magnitude V of the scanning vectors, a first threshold value T1 for tracing a ridge line space(radius of the circle in FIG. 5), a second threshold value T2 in inequalities (1) and (2), and a spacing b of the scanning lines(FIG. 11(b)) are to be determined by design. The magnitude V(scanning vectors of FIG. 4(b) and FIG. 9(b) can have different magnitude) determines the total scanning area, T1 determines the fineness of tracing, and b and T2 determines a criterion for a classification. It will be easy to determine proper values for these constants in a cut and try method.

Although only preferred embodiments have been described on this invention, it must be understood that various modifications can be made without departing from the spirit of this invention. For example, total number of scanning vectors may not be 8 (FIG. 4(b)) and 17(FIG. 9(b)), and the vectors may not be equispaced.

What is claimed is:

1. An apparatus for automatic fingerprint classification of a fingerprint image having a finger joint image, a fingertip image, ridge lines and a core point, said core point being used as an origin for original x-y rectangular coordinates, an x-axis of said original x-y rectangular coordinates being parallel to said finger joint image and said fingertip image being in a y>0 direction, said apparatus comprising:

an initialization unit for setting current temporary x-y rectangular coordinates with said original x-y rectangular coordinates;

means for tracing space between two ridge lines starting from said core point in an area where x>0 and in an area where x<0 with respect to said original x-y rectangular coordinates, said means for tracing space including, a scanning unit for distance measurement, wherein said scanning unit for distance measurement scans said fingerprint image by vectors having a same magnitude, starting from an origin of said current temporary x-y rectangular coordinates and diverging in different directions, for obtaining measured distances from said origin of said current temporary x-y rectangular coordinates to first cross points between said ridge lines in said fingerprint image and said vectors, a next coordinate determination unit, wherein said next coordinate determination unit selects a nearest vector to one of a −x axis and a +x axis of said current temporary x-y rectangular coordinates among said vectors with said measured distances larger than a predetermined threshold distance, sets said nearest vector as one of a −x axis and a +x axis of next temporary x-y rectangular coordinates, and decides a middle point between said origin of said current temporary x-y rectangular coordinates and said first cross point of said one of said −x axis and said +x axis of said next temporary x-y rectangular coordinates as an origin of said next temporary x-y rectangular coordinates, a tracing vector memory for storing position coordinates of all origins of said current and next temporary x-y rectangular coordinates with respect to said original x-y rectangular coordinates, a judgment unit for deciding a termination condition to go back to said scanning unit, and an update unit for setting said current temporary x-y rectangular coordinates with said next temporary x-y rectangular coordinates; and a classifier unit for classifying said fingerprint image from data stored in said tracing vector memory, wherein loci of said origins of said next temporary x-y rectangular coordinates stored in said tracing vector memory in −x and +x areas with respect to said original x-y rectangular coordinates are examined and classified as one of a straight line and a semicircle, a fingerprint pattern with a semicircle in both said −x and +x area with respect to said original x-y rectangular coordinates is classified as a whorl, a fingerprint pattern with a semicircle in said +x area with respect to said original x-y rectangular coordinates and a straight line in said −x area with respect to said original x-y rectangular coordinates is classified as a left loop, a fingerprint pattern with a semicircle in said −x area with respect to said original x-y rectangular coordinates and a straight line in said +x area with respect to said original x-y rectangular coordinates is classified as a right loop, and a fingerprint pattern with straight line in both said −x and +x area with respect to said original x-y rectangular coordinates is classified as an arch.

2. An apparatus for automatic fingerprint classification, comprising:

means for converting a fingerprint image to a set of binary data and storing said set of binary data in a fingerprint image memory, said fingerprint image including a finger joint image, a fingertip image, and ridge lines;

a core point determination unit for detecting a core point of a fingerprint image stored in said fingerprint image memory, and for choosing original x-y rectangular coordinates, wherein an origin of said original x-y rectangular coordinates is at said core point, an x axis of said original x-y rectangular coordinates being parallel to said finger joint image, and said fingertip image being in a y>0 direction;

an initialization unit for setting current temporary x-y rectangular coordinates with said original x-y rectangular coordinates;

means for tracing space between two ridge lines starting from said core point in an area where x>0 and in an area where x<0 with respect to said original x-y rectangular coordinates, said means for tracing space including, a scanning unit for distance measurement, wherein said scanning unit for distance measurement scans said fingerprint image by vectors having a same magnitude, starting from an origin of said current temporary x-y rectangular coordinates and diverging in different directions, for obtaining measured distances from said origin of said current temporary x-y rectangular coordinates to first cross points between said ridge lines in said fingerprint image and said vectors, a next coordinate determination unit, wherein said next coordinate determination unit selects a nearest vector to one of a −x axis and a +x axis of said current temporary x-y rectangular coordinates among said vectors with said measured distances larger than a predetermined threshold distance, sets said nearest vector as one of a −x axis and a +x axis of next temporary x-y rectangular coordinates, and decides a middle point between said origin of said current temporary x-y rectangular coordinates and said first cross point of said one of said −x axis and said +x axis of said next temporary x-y rectangular coordinates as an origin of said next temporary x-y rectangular coordinates, a tracing vector memory for storing position coordinates of all origins of said current and next temporary x-y rectangular coordinates with respect to said original x-y rectangular coordinates, a judgment unit for deciding a termination condition to go back to said scanning unit, and an update unit for setting said current temporary x-y rectangular coordinates with said next temporary x-y rectangular coordinates; and a classifier unit for classifying said fingerprint image from data stored in said tracing vector memory, wherein loci of said origins of said next temporary x-y rectangular coordinates stored in said tracing vector memory in −x and +x areas with respect to said original x-y rectangular coordinates are examined and classified as one of a straight line and a semicircle, a fingerprint pattern with a semicircle in both said −x and +x area with respect to said original x-y rectangular coordinates is classified as a whorl, a fingerprint pattern with a semicircle in said +x area with respect to said original x-y rectangular coordinates and a straight line in said −x area with respect to said original x-y rectangular coordinates is classified as a left loop, a fingerprint pattern with a semicircle in said −x area with respect to said original x-y rectangular coordinates and a straight line in said +x area with respect to said original x-y rectangular coordinates is classified as a right loop, and a fingerprint pattern with straight line in both said −x and +x area with respect to said original x-y rectangular coordinates is classified as an arch.

\* \* \* \* \*